(12) United States Patent
Donner

(10) Patent No.: US 6,220,738 B1
(45) Date of Patent: Apr. 24, 2001

(54) MOTOR VEHICLE DEVICE HAVING ILLUMINATED DISPLAY AREA FOR DIRECTING USER ACTUATION OF THE DEVICE

(75) Inventor: Harald Donner, Meinerzhagen (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/362,320

(22) Filed: Jul. 27, 1999

(30) Foreign Application Priority Data

Aug. 10, 1998 (DE) .............................. 198 36 120

(51) Int. Cl.[7] ...................................... B60Q 3/00
(52) U.S. Cl. .................. 362/545; 362/491; 362/540; 362/231; 40/556; 116/28.1
(58) Field of Search ...................... 362/489, 491, 362/234, 231, 230, 85, 30, 29, 545, 540, 510; 116/28.1, DIG. 20; 40/552, 556, 593

(56) References Cited

U.S. PATENT DOCUMENTS

| | | | |
|---|---|---|---|
| 4,137,864 | * 2/1979 | Lauper | 116/28.1 |
| 4,991,535 | * 2/1991 | Kobayashi et al. | 116/28.1 |
| 5,091,833 | * 2/1992 | Paniaguas et al. | 362/234 |
| 5,159,892 | * 11/1992 | Hara et al. | 116/28.1 |
| 5,369,553 | * 11/1994 | Trusiani | 362/31 |
| 5,619,182 | * 4/1997 | Robb | 362/231 |
| 5,785,404 | * 7/1998 | Wiese | 362/489 |
| 5,900,678 | * 5/1999 | Rodgers | 362/491 |
| 5,968,382 | * 10/1999 | Matsumoto et al. | 219/121.72 |
| 6,044,790 | * 4/2000 | Murakami | 362/491 |

\* cited by examiner

*Primary Examiner*—Alan Cariaso
(74) *Attorney, Agent, or Firm*—Brooks & Kushman P.C.

(57) ABSTRACT

A device for motor vehicles is proposed which comprises a pictograph which is disposed in an at least partially transparent device part, can be optically highlighted by light beams and is produced by means of a process of influencing the material of the device part in a mechanical manner. In order to form three-dimensional pictographs in any color, the pictograph is produced in the material of an originally homogenous component of the device part and the pictograph is allocated a light coupling-in site, which is located on a lateral region of the component, in such a manner that the pictograph is at least partially captured and illuminated accordingly by the light beam bundle which is coupled via said light coupling-in site into the component.

9 Claims, 1 Drawing Sheet

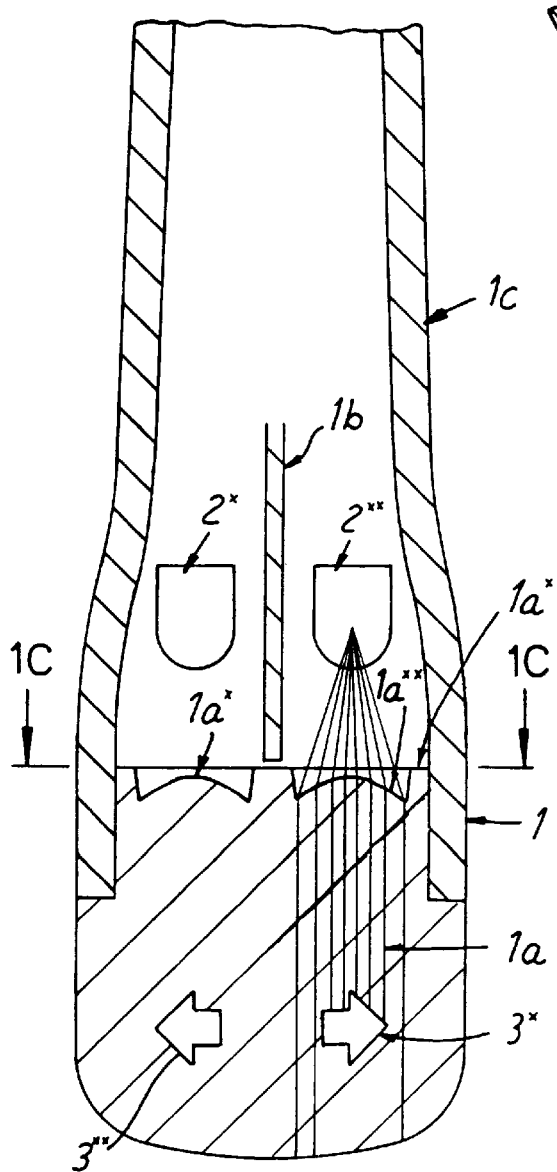
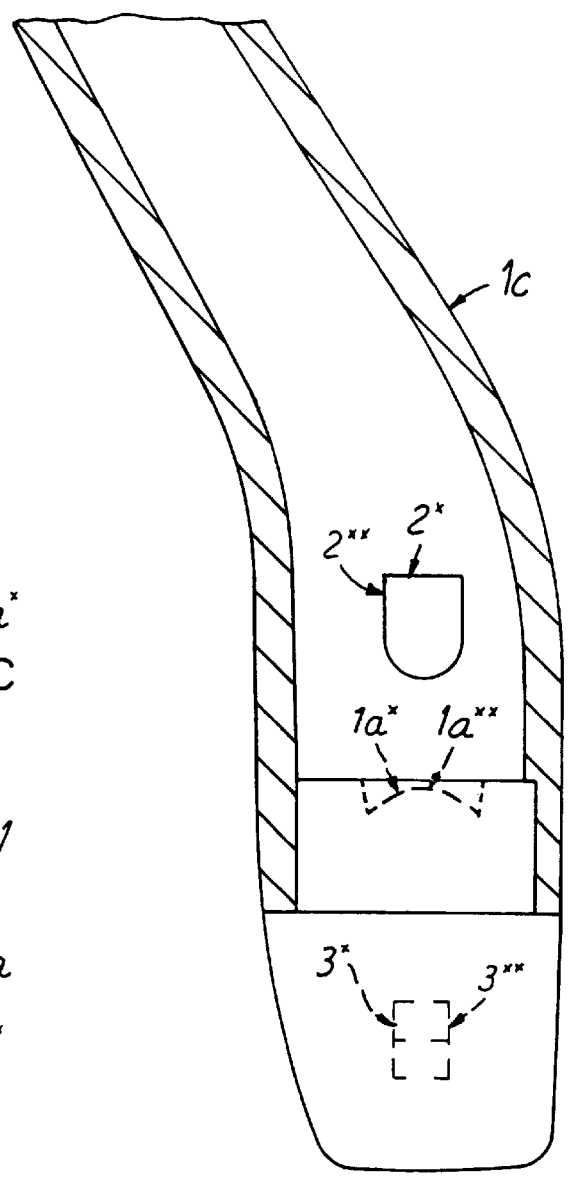
FIG. 1a  FIG. 1b
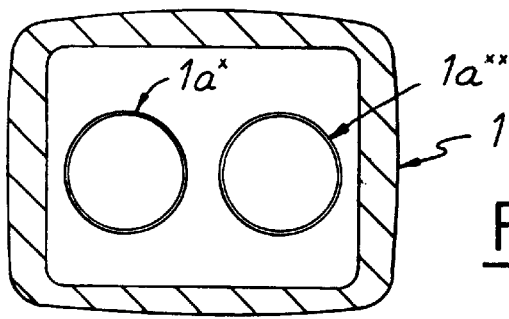
FIG. 1c

MOTOR VEHICLE DEVICE HAVING ILLUMINATED DISPLAY AREA FOR DIRECTING USER ACTUATION OF THE DEVICE

The present invention relates to an operation and/or display device designed according to the preamble of the main claim.

Devices of this type are provided, for example, in motor vehicles for the purpose of initiating, in particular, electrical functional procedures in a defined manner by means of a pictograph or to illustrate functional situations by virtue of pictographs of this type.

In this context, it is generally known in motor vehicles to provide, for example, switch levers of electrical switching devices with pictographs on their free end which is to be regarded as the switch button, said pictographs serving to illustrate the possible actuating direction(s). In order to highlight the pictograph(s) in darkness, the artificially illuminated switch button is formed either from a colour-painted, transparent synthetic material body or from a synthetic material body which is produced in the so-called two-colour injection moulding process. The external, coloured, e.g. black, layer is removed in a mechanical manner, for example, using laser technology, so that by virtue of an illumination source which is allocated to the synthetic material body the pictograph(s) stand out clearly against the coloured surface layer. The problem of this type of pictograph design is that it is only possible to produce one two-dimensional illustration whose ability to be coloured is limited.

Consequently, it is the object of the present invention to develop further an operation and/or display device of the type mentioned in the introduction such that it is possible to achieve a three-dimensional pictograph design in any colour.

In accordance with the invention, the object is achieved by virtue of the features stated in the characterising part of the main claim. The advantage of this type of embodiment of the subject matter of the invention is that the pictograph is effectively protected from becoming damaged such as e.g. becoming blurred or the like.

Further advantageous embodiments of the subject matter of the invention are stated in the subordinate claims and are explained in detail with reference to one exemplified embodiment which is illustrated in the drawing, in which FIG. 1a shows a central longitudinal sectional view of a device part of the display and/or operation device, FIG. 1b shows a longitudinal sectional view, rotated 90° with respect to the illustration as shown in FIG. 1a, of the device part, FIG. 1c shows a cross-section of the device part as shown in FIG. 1a according to line A—A.

As is evident in the drawing, a switching system [not illustrated in detail for the sake of simplicity] is provided with an operation device which comprises a device part 1 which is formed as an actuating member (switch lever). This device part consists of a component 1a which is designed as a switch button, and of an elongated hollow body 1c which holds the component and comprises a separating wall 1b. The switch button is disposed on the one (free) end of the hollow body which is allocated with its other end to the switching means [likewise not illustrated for simplicity]. The three-dimensional pictographs 3*, 3** are provided in the, preferably glass, transparent material of the component and in the present case the said pictographs represent direction arrows which serve to illustrate in which direction the device part (switch lever) can be displaced.

These pictographs which are provided more or less centrally in the component 1a (switch button) are produced by virtue of the fact that the component is influenced with high-energy beams such as e.g. laser beams, wherein these beams are focussed upon the site which is predetermined for the respective pictograph. Each short-time beam bombardment produces in the originally homogeneous material of the component a micro-crack and by changing the position of the focal point it is possible to produce virtually any three-dimensional configuration for the pictograph (in the drawing the irregularities are illustrated by dot-dash lines).

This type of pictograph which is clearly visible in daylight can then be highlighted in a particularly effective manner by the use of light beams. For this purpose, the component 1a which is rectangular in principle is provided on one lateral region 1a'—facing the inner space of the hollow body 1c—with two light coupling-in sites 1a*, 1a** which are formed in each case as aspherical lenses which are disposed recessed in the transparent material. These two light coupling-in sites are allocated a respective illumination source 2*, 2** which are preferably formed as light-emitting diodes and which are optically separated from each other by virtue of the separating wall 1b provided in the hollow body 1c. By virtue of the aspherical lenses the diverging beam bundle emitted by the illumination sources is converted into a parallel beam bundle, wherein the extension of the parallel beam bundle is selected in such a manner that in any event the respective pictograph is captured in full.

Naturally, the formation and arrangement can also be such that of a complex pictograph only a portion thereof is captured by the light beams. By emitting different coloured light beams which are coupled-in at various light coupling-in sites, it is possible to illustrate the pictographs in different colours, wherein it is irrelevant whether these are pictographs which are separated from each other spatially or a complex pictograph having a design which is graduated in the three dimensions. It is also possible to change the impression of the pictographs by superimposing different coloured light beams.

What is claimed is:

1. A motor vehicle device having a display area for directing actuation by a user, the device comprising:

a hollow body having an inner space;

a transparent component connected to the hollow body, the transparent component having a solid core, the solid core having cracks which form a three-dimensional pictograph, wherein the cracks forming the three-dimensional pictograph are produced in the solid core of the transparent component by subjecting the solid core of the transparent component to laser beams from a laser beam source;

an illumination source for generating light beams, the illumination source contained within the inner space of the hollow body and oriented towards the transparent component; and a light coupling-in site recessed in the transparent component facing the illumination source, wherein the light coupling-in site couples the light beams from the illumination source into the transparent component to illuminate the three-dimensional pictograph.

2. The device of claim 1 wherein:

the light coupling-in site couples the light beams from the illumination source directly on to the region of the transparent component part having the pictograph.

3. The device of claim 1 wherein:

the height of the three-dimensional pictograph is uniform.

4. The device of claim 1 wherein:
the height of the three-dimensional pictograph is graduated.

5. The device of claim 1 wherein:
the light coupling-in site is a lens.

6. The device of claim 5 wherein:
the lens is an aspherical lens and converts the light beams from the illumination source into parallel light beams.

7. The device of claim 1 wherein:
the illumination source is a light emitting diode.

8. The device of claim 1 further comprising:
a plurality of illumination sources for generating respective light beams, each of the light beams having a different wavelength; and
a plurality of light coupling-in sites each associated with a respective illumination source for coupling the light beams into the transparent component to illuminate the pictograph.

9. The device of claim 1 wherein:
the hollow body is a motor vehicle switch lever.

* * * * *